United States Patent [19]

Matsuhisa et al.

[11] Patent Number: 4,645,700

[45] Date of Patent: Feb. 24, 1987

[54] CERAMIC HONEYCOMB STRUCTURAL BODY

[75] Inventors: Tadaaki Matsuhisa, Kasugai; Kiminari Kato, Nagoya, both of Japan

[73] Assignee: NGK Insulators, Ltd., Japan

[21] Appl. No.: 651,860

[22] Filed: Sep. 18, 1984

[30] Foreign Application Priority Data

Oct. 7, 1983 [JP] Japan .............................. 58-186880

[51] Int. Cl.[4] ............................................ B32B 3/12

[52] U.S. Cl. ...................................... 428/116; 165/10

[58] Field of Search .............................. 428/116–118; 165/10 R

[56] References Cited

U.S. PATENT DOCUMENTS

| | | | |
|---|---|---|---|
| 3,755,204 | 8/1973 | Sergeys | 428/116 X |
| 3,790,654 | 2/1974 | Bagley | 428/116 X |
| 3,872,564 | 3/1975 | Myers et al. | 428/116 X |
| 4,259,925 | 4/1981 | Barnert et al. | 118/DIG. 5 |
| 4,304,585 | 12/1981 | Oda et al. | 65/43 |
| 4,357,987 | 11/1982 | Oda et al. | 65/33 X |
| 4,358,428 | 11/1982 | Fujita et al. | 423/239 |
| 4,448,833 | 5/1984 | Yamaguchi et al. | 428/116 |
| 4,455,336 | 6/1984 | Ogawa et al. | 428/116 |
| 4,550,005 | 10/1985 | Kato | 264/177 R |

OTHER PUBLICATIONS

Heat Transfer and Flow Friction Characteristics for Fin Geometries of Extruded Ceramic Regenerator Core; by T. Matsuhisa and I. Oda-1983, Tokyo Int'l Gas Turbine Congress.

Ceramic Regenerator Systems Development Program; by J. A. Cook, C. A. Fucinari, J. N. Lingscheit, C. J. Rahnke and V. D. Rao-May 1978.

Heat-Transfer and Flow-Friction Characteristics of Skewed-Passage and Glass-Ceramic Heat-Transfer Surfaces; by C. P. Howard-Jan. 1965.

*Primary Examiner*—Henry F. Epstein

*Attorney, Agent, or Firm*—Parkhurst & Oliff

[57] ABSTRACT

Disclosed herein is a ceramic honeycomb structural body which has cells of a rectangular section in which the pitch ratio between the short side and the long side of the cells is substantially $1:\sqrt{3}$. A method of manufacturing a ceramic honeycomb structural body and a die for extruding a ceramic honeycomb structural body are also disclosed. The die comprises molding slits having a profile corresponding to a sectional profile of a ceramic honeycomb structural body and ceramic raw batch material supply holes through which a ceramic raw batch material is supplied to the molding slits, wherein the pitch ratio between the short side and the long side of the molding slits is substantially $1:\sqrt{3}$. Further, a rotary regenerator type ceramic heat exchanger composed of the ceramic honeycomb structural body is disclosed.

5 Claims, 13 Drawing Figures

CERAMIC HONEYCOMB STRUCTURAL BODY

BACKGROUND OF THE INVENTION (1) Field of the Invention

The present invention relates to a ceramic honeycomb structural body, a method of manufacturing the same, an extrusion die therefor, and a rotary regenerator type ceramic heat exchanger utilizing such a ceramic honeycomb structural body as a main component. More specifically, the invention relates to a ceramic honeycomb structural body which is suitable for use in a rotary regenerator type ceramic heat exchanger for a gas turbine including a ceramic heat exchanger for the automobiles as a preferred embodiment, a method of manufacturing the same, and a die of extruding the same, and a rotary regenerator type ceramic honeycomb type heat exchanger.

The ceramic honeycomb structural body used herein means a ceramic structural body having a plurality of cells divided by partition walls.

(2) Description of the Prior Art

Heretofore, there have been known, as the ceramic honeycomb structural body, that obtained by a corrugation molding method disclosed in Japanese Patent Publication No. 48(1973)-22,964, that obtained by an embossing molding method as disclosed in U.S. Pat. No. 3,755,204, and that obtained by an extrusion molding method as disclosed in Japanese Patent Laid-Open No. 55(1980)-46,338.

It is reported, however, that honeycomb structural bodies according to the corrugation molding method and the embossing molding method unfavorably have a large pressure drop ($\Delta P$) and a large wall surface friction factor (friction factor) (F) because the profile of the cells are ununiform and the surfaces of the cells are not smooth, and particularly, since the honeycomb structural body according to the corrugation molding method has the cells with a sine triangular shape in section, the corner portions thereof are acute, and the ratio of basic heat transfer (Colburn number) (J) is poor, so that the heat exchange efficiency is small.

On the other hand, gas turbine rotary regenerator type ceramic heat exchangers for gas turbines including the rotary regeneration type ceramic heat exchanger for automobiles as a preferred embodiment thereof, have demanded ceramic honeycomb heat exchangers having excellent heat exchange efficiency, while being compact with high performances, since they need to be placed in a limited space. The heat exchange efficiency of the ceramic heat exchanger is broken down into a heat exchanger efficiency of a unit cell and the heat exchange efficiency as the whole heat exchanger. The heat exchange efficiency of the unit cell can be evaluated by the overall fin efficiency (J/F), in which J and F are represented by a function of the Reynolds number respectively. The heat exchange efficiency of the whole heat exchanger is represented by the exchanger heat transfer effectiveness ($\epsilon$) and the pressure drop ($\Delta P$), and is represented by a function of the flow rate of a fluid per unit area of the heat exchanger.

The ceramic heat exchanger obtained by extrusion molding has the merits that since it has a uniform shape and smooth cell surfaces, the pressure drop and the friction factor are small, and the Colburn number is large, the overall fin efficiency is large as compared with the other manufacturing methods. In order to obtain a ceramic heat exchanger having an excellent heat exchanger efficiency, it is necessary to enhance the exchanger heat transfer effectiveness by selecting a cell structure with a large overall fin efficiency and densifying the cells, and reduce the pressure drop of the heat exchanger.

SUMMARY OF THE INVENTION

It is an object of the present invention to provide a ceramic structural body which eliminates the abovementioned problems encountered by the prior art.

More specifically, one object of the present invention is to provide a ceramic honeycomb structural body which has a cell structure with a large overall fin efficiency and a large exchanger heat transfer effectiveness, and is produced by extrusion.

It is another object of the present invention to provide a method of producing a ceramic honeycomb structural body which has a cell structure with a large overall fin efficiency and a large exchanger heat transfer effectiveness.

It is still another object of the present invention to provide a die for extrusion of a ceramic honeycomb structural body which has a cell structure with a large overall fin efficiency and a large exchanger heat transfer effectiveness.

It is a further object of the present invention to provide a rotary regenerator type ceramic heat exchanger using such a ceramic honeycomb structural body.

According to the first aspect of the present invention, there is a provision of a ceramic honeycomb structural body having cells of a rectangular section in which the pitch ratio between and the short side and the long side of the cells is substantially $1:\sqrt{3}$.

According to the second aspect of the invention, there is a provision of a method of manufacturing the ceramic honeycomb structural body, which comprises the steps of preparing a ceramic raw batch material, press supplying the raw batch material into rectangular molding slits with the pitch ratio between the short side and the long side being substantially $1:\sqrt{3}$ through raw batch material supply holes of an extrusion die to extrude an integral honeycomb structural body, and drying and firing said structural body.

According to the third aspect of the invention, there is a provision of a method of manufacturing a ceramic honeycomb structural body, which comprises the steps of preparing a ceramic raw batch material, press supplying the raw batch material into rectangular molding slits of the pitch ratio between the short side and the long side being substantially $1:\sqrt{3}$ through raw batch material supply holes of an extrusion die to extrude an integral honeycomb structural body, drying and firing said structural body, processing the fired structural body to produce a unit honeycomb structural body into a desired shape, joining a plurality of such unit honeycomb structural bodies, and then firing the joined honeycomb structural bodies again.

According to the fourth aspect of the present invention, there is a provision of a die for extruding a ceramic honeycomb structural body, which comprises molding slits having a profile corresponding to the sectional profile of the ceramic honeycomb structural body with cells of a rectangular section, and ceramic raw batch material supply holes through which a raw batch material is supplied, wherein the pitch ratio between the short side and the long side of the rectangular slits is substantially $1:\sqrt{3}$.

According to the fifth aspect of the present invention, there is a provision of a die for extruding a ceramic honeycomb structural body, which comprises molding slits having a profile corresponding to the sectional profile of the ceramic honeycomb structural body with the cells of a rectangular section, and ceramic raw batch material supply holes through which the raw batch material is supplied, and a perforated plate arranged on the raw batch material supply side of the supply holes and having a plurality of holes perforated at such a rate that the raw batch material is supplied to three supply holes through each one of the perforated holes, wherein the pitch ratio between the short side and the long side of the rectangular slits is substantially $1:\sqrt{3}$.

According to the sixth aspect of the present invention, there is a provision of a rotary regenerator type ceramic honeycomb heat exchanger using the ceramic honeycomb structural body of the present invention, which heat exchanger is composed of the ceramic honeycomb structural body having cells of a rectangular section in which the pitch ratio between the short side and the long side is substantially $1:\sqrt{3}$.

These and other objects, features and advantages of the present invention will be well appreciated upon reading of the following description of the invention when taken in conjunction with the attached drawings with understanding that some modifications, variations and changes could be performed by the skilled in the art to which the invention pertains without departing from the spirit of the invention and the scope of claims appended hereto.

DETAILED DESCRIPTION OF THE INVENTION

In the following, the construction of the present invention will be explained taking a specific honeycomb structural body as an example with reference to the accompanying drawings.

Figure 1:
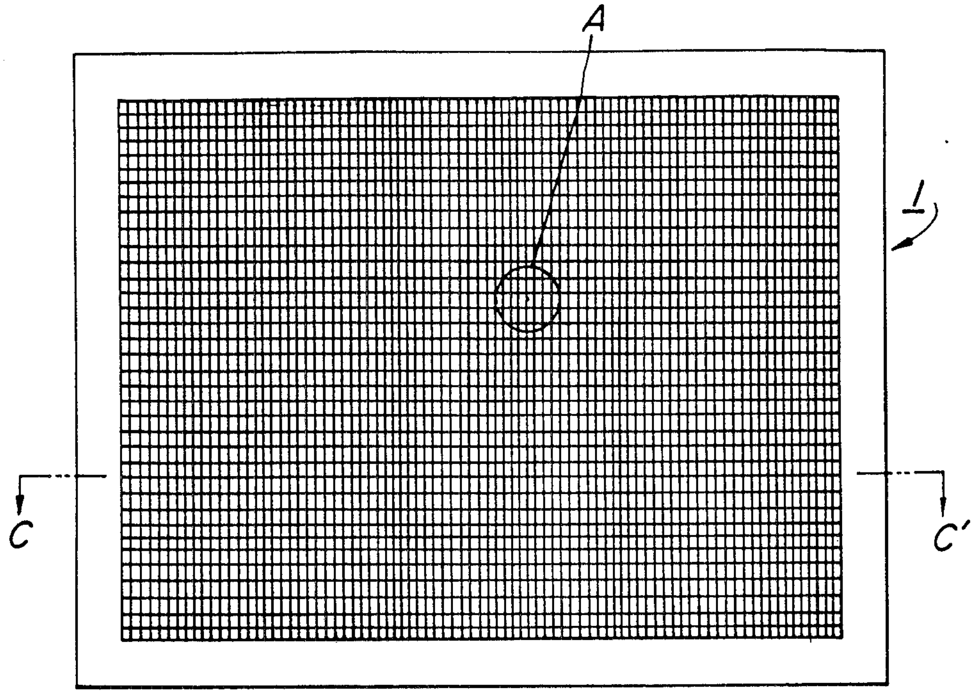
FIG. 1 is a front view of a rectangular die according to the present invention in which the pitch ratio between the short side and the long side is substantially $1:\sqrt{3}$.
Figure 2:
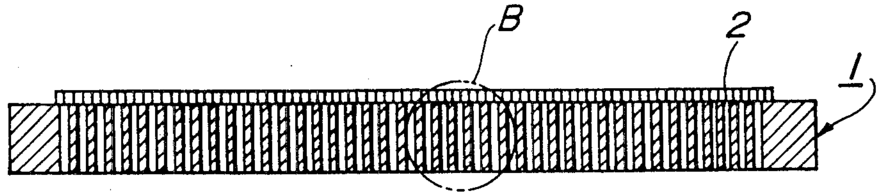
FIG. 2 is a sectional view of the die in FIG. 1 along C—C'.
Figure 3:
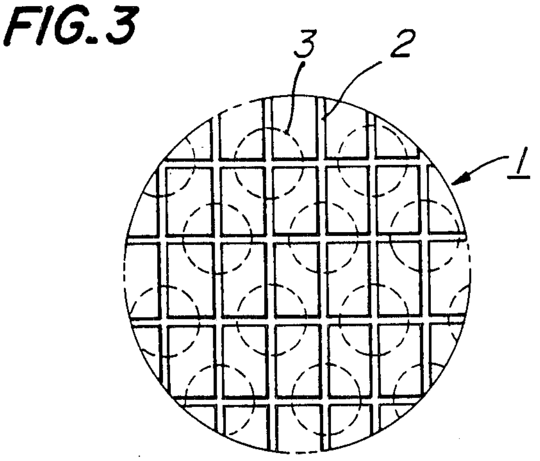
FIG. 3 is an enlarged view of the die at a portion A in FIG. 1.
Figure 4:
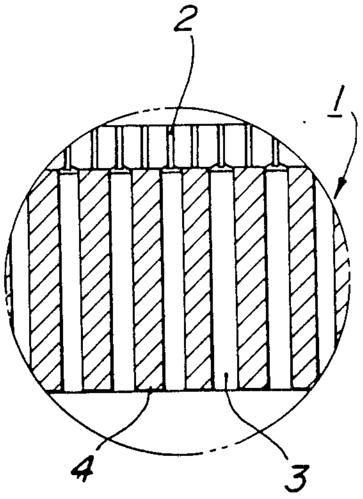
FIG. 4 is an enlarged view of the die at a portion B in FIG. 2.

A die 1 shown in FIGS. 1–4 is provided with molding slits 2 rectangularly arranged at a pitch of the length of the short side of 0.564 mm and the length of the long side of 0.977 mm, and has ceramic body supply holes 3 connected to every two intersecting portions of the molding slits 2 as shown in FIG. 3. The ceramic raw batch material is press supplied from the raw batch material supply side 4 of the die 1 shown in FIG. 4. The raw batch material is obtained by kneading a ceramic powder selected from silicon nitride, silicon carbide, alumina, mullite, cordierite, lithium aluminum silicate, magnesium aluminum titanate and so on and compounds which produce such a ceramic when fired, together with an organic binder such as methyl cellulose, sodium alginate, polyvinyl alcohol, vinyl acetate resin or the like as a molding aid and an appropriate amount of water, which gives a fully fluidizing property when being extruded.

Figure 5:
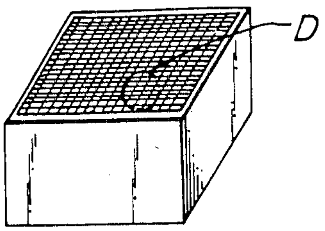
FIG. 5 is a schematic view of a rectangular ceramic honeycomb structural body according to the present invention having cells in a rectangular shape in which the pitch ratio between the short side and the long side is substantially $1:\sqrt{3}$.
Figure 6:
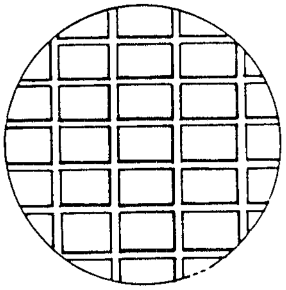
FIG. 6 is an enlarged view of the die at a portion D in FIG. 5.

When the press supplied raw batch material reaches the molding slits 2, it flows orthogonally to an extrusion direction, so that the integral structure honeycomb structural body is formed in and extruded from the molding slits 2. The extruded honeycomb structural body is cut at a given length, dried by an induction electric drying method or the like, and fired by an ordinary method. Thereby, the honeycomb structural body according to the present invention as shown in FIGS. 5 and 6 is obtained. FIG. 6 is an enlarged view of the open end face of the honeycomb structural body according to the present invention.

A rotary regenerator type ceramic heat exchanger from the ceramic honeycomb structural body thus obtained is produced by processing the ceramic honeycomb structural body into a desired profile to obtain a unit honeycomb structural body, joining together a plurality of the unit honeycomb structural bodies thus obtained and refiring the joined honeycomb structural bodies.

Figure 7:
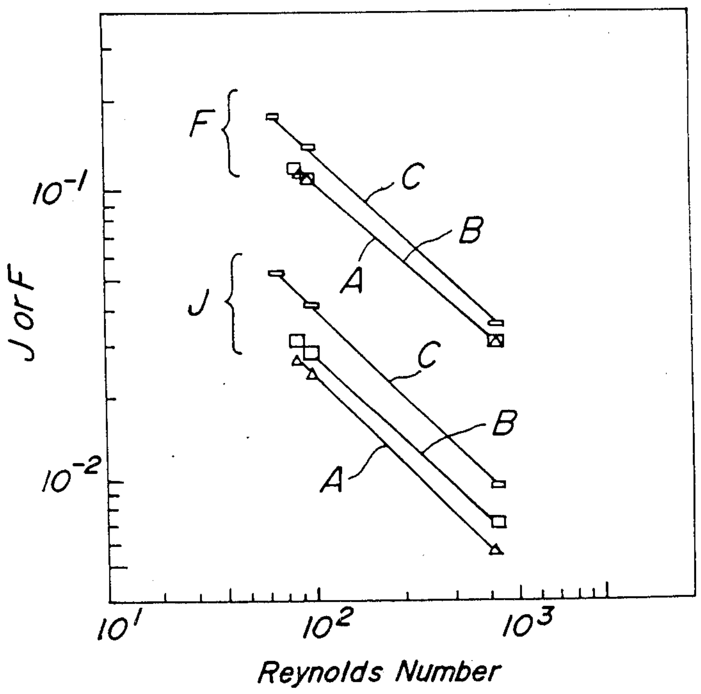
FIG. 7 is a graph showing measured values of friction factor and the Colburn number vs the Reynolds number with respect to the honeycomb structural bodies having triangular cells, square cells and rectangular cells in which the pitch ratio between the short side and the long side is substantially $1:\sqrt{3}$, respectively.

According to the present invention, the pitch ratio between the short side and the long side in the molding slits is set at substantially $1:\sqrt{3}$, which is for the following reason. That is, as shown in Table 1 and FIG. 7, the Colburn number (J) and friction factor (F) of ceramic honeycomb structural bodies having a triangular cell shape [shown in FIG. 7 by Δ (line A)], a square cell shape [shown in FIG. 7 by □ (line B)] and a rectangular cell shape [shown in FIG. 7 by □ (line C)] in which the pitch ratio between the short side and the long side is substantially $1:\sqrt{3}$ and having the cell characteristics of open area ratio of 0.70, and hydraulic diameter of 0.54 mm were measured, and the overall fin efficiency (J/F) was measured at the time of the Reynolds number of 100. As a result, it was found that the overall fin efficiency of the ceramic honeycomb structural body is maximized in the case that the ceramic honeycomb structural body has a rectangular shape in which the pitch ratio between the short side and the long side is substantially $1:\sqrt{3}$.

TABLE 1

Colburn number, friction factor, and overall fin efficiency at the time of the Reynolds number being 100 in the cases of honeycomb structural bodies having (A) triangular cell shape, (B) square cell shape, and (C) rectangular cell shape in which the pitch ratio between the short side and the long side is substantially $1:\sqrt{3}$.

| Cell shape | Colburn number J | Friction factor F | Overall fin efficiency J/F |
|---|---|---|---|
| A. Triangular cell shape | 0.024 | 0.108 | 0.222 |
| B. Square cell shape | 0.028 | 0.108 | 0.259 |
| C Rectangular cell shape with the pitch ratio between the short side and the long side being substantially $1:\sqrt{3}$ | 0.041 | 0.139 | 0.295 |

Figure 8:
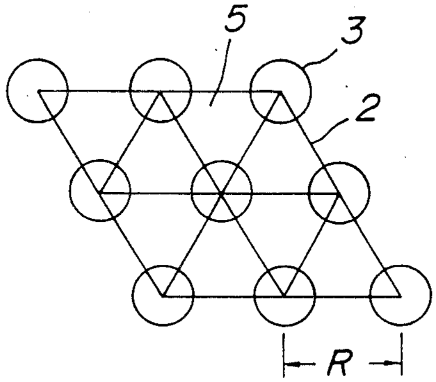
FIG. 8 is a schematic view of an equilateral hexagonal arrangement of ceramic raw material supply holes in an extrusion die.
Figure 9:
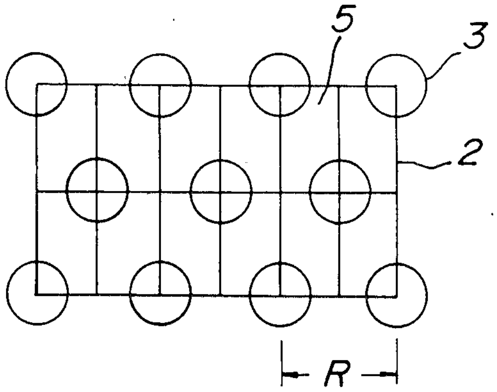
FIG. 9 is a schematic view of a die for extrusion according to the present invention illustrating that the raw batch material supply holes in the extrusion die are in equilateral hexagonal arrangement in which the pitch ratio between the short side and the long side in the molding slits is substantially $1:\sqrt{3}$.
Figure 10:
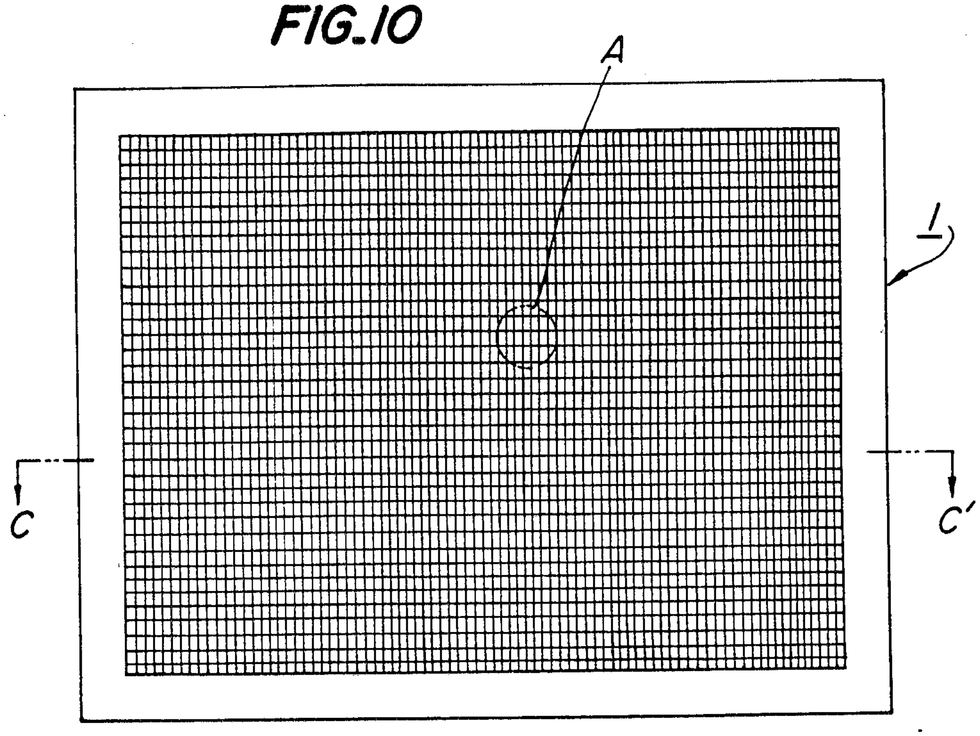
FIG. 10 is a front view of an extrusion die equipped with a perforated plate in which the pitch ratio between the short side and the long side is substantially $1:\sqrt{3}$.

Further, as shown in FIG. 8, when the distance R between the supply holes is constant, the extrusion die in which the cell density (number of the cells 5 per unit area) is the highest is the case in which the ceramic raw batch material supply holes 3 of the extrusion die are bored in an equilateral hexagonal arrangement (which means that the number of the supply holes 3 immediately adjacent to each respective hole is six). When the holes are bored in the equilateral hexagonal arrangement, as shown in FIG. 9, the supply holes 3 are not only connected to the alternate intersecting portions of the rectangular molding slits 2, but also, the pitch ratio between the short side and the long side of the molding slits 2 becomes substantially $1:\sqrt{3}$. The above-mentioned fact has been first discovered by the present inventors. It has been considered that such an equilateral hexagonal arrangement as shown in FIG. 8 could be applied only to the supply holes connected to the molding slits 2 for the triangular cells 5.

Since the exchanger heat transfer effectiveness can be enhanced by increasing the cell density, the rectangular cell structure having the pitch ratio between the short side and the long side being substantially $1:\sqrt{3}$ has the largest overall fin efficiency, and the cells can be densified and the exchanger heat transfer effectiveness is high, so that a heat exchanger having a good heat exchange efficiency can be obtained.

The foregoing is the reason why the ceramic honeycomb structural body having the sectionally rectangular cells in which the pitch ratio between the short side and the long side of the cells is substantially $1:\sqrt{3}$ has an excellent heat exchange efficiency in the rotary regeneration type ceramic heat exchanger for the gas turbine which includes particularly the ceramic heat exchanger for automobiles as a preferable example.

Figure 11:
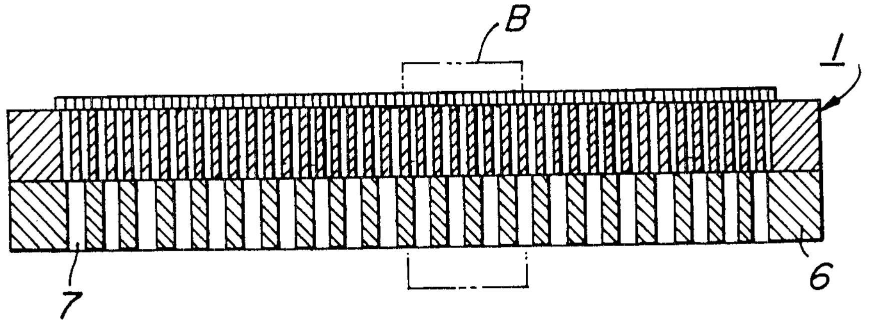
FIG. 11 is a sectional view of the die in FIG. 10 along C—C'.
Figure 12:
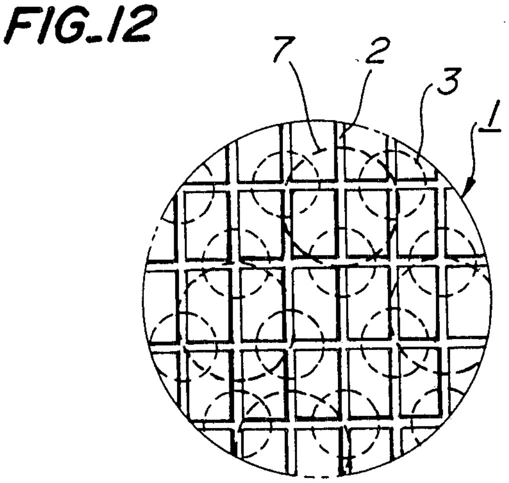
FIG. 12 is an enlarged view of the die at a portion A in FIG. 10.
Figure 13:
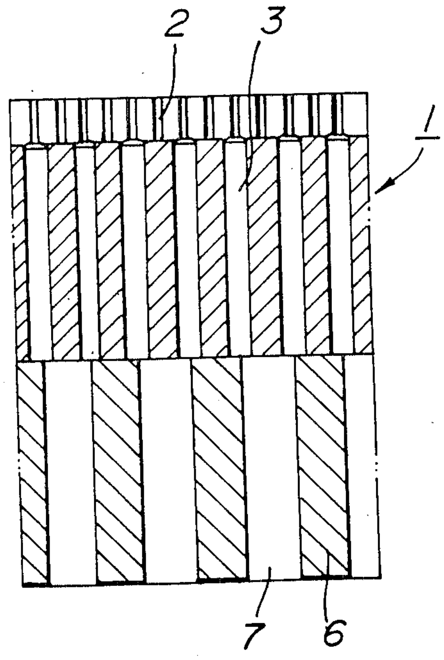
FIG. 13 is an enlarged view of the die at a portion D in FIG. 11.

As the die for extrusion of the honeycomb structural body according to the present invention, there may be employed a die in which a perforated plate is provided on the raw batch material supply side of the supply holes and has perforated holes at such a rate that the raw batch material is supplied into three raw batch material supply holes through each one of the perforated holes. That is, as shown in FIGS. 10-13, the perforated plate 6 is arranged on the ceramic raw batch material supply side 4 of the die 1, a plurality of holes 7 are perforated in the perforated plate 6, and each one of the perforated holes 7 is connected to the three raw batch material supply holes 3 to supply the ceramic body (FIGS. 11 and 12). The perforated plate 6 is for increasing the mechanical strength of the die 1 for extrusion of the honeycomb structural body. Although, the die for extrusion of the honeycomb structural body according to the present invention may tend to be weak because of the provision of the raw batch material supply holes at a high density, such a tendency is prevented by this perforated plate.

Further, the rotary regenerator type ceramic heat exchanger according to the present invention may be produced by preparing a ceramic raw batch material, press supplying the raw batch material thus prepared into the molding slits, with the pitch ratio between the short side and the long side being substantially $1:\sqrt{3}$, through the raw batch material supply holes of the extrusion die to extrude an integral structure honeycomb structural body, drying and firing the resulting structural body, processing it into a desired profile to obtain a unit honeycomb structural body, joining a plurality of the thus obtained unit honeycomb structural bodies, and then firing the joined unit honeycomb structural bodies again.

The present invention will be explained more in detail with reference to specific Examples, but they are given merely for the illustration of the invention, and should not be interpreted to limit the scope of the invention.

EXAMPLE 1

5 parts by weight (hereinafter referred to briefly as "parts") of methyl cellulose and 25 parts of water were added to 100 parts of a powder consisting of 36.5 parts of talc powder, 46.1 parts of kaolinite powder, and 17.4 parts of aluminum hydroxide, and the mixture was then kneaded to prepare a raw batch material. The raw batch material was extruded under pressure of 120 $kg/cm^2$ by using a rectangular extrusion die according to the present invention having the molding slits of 0.13 mm in the molding slit width 0.632 mm in the length of the short side and 1.096 mm in the length of the long side with the pitch ratio between the short side and the long side being $1:\sqrt{3}$. The honeycomb structural body thus extruded was cut at a given length, dried according to the induction electric drying method, and fired at 1,400° C. for 5 hours in a tunnel kiln for fully converting the ceramic body into cordierite, so that a rectangular ceramic honeycomb structural body of the invention having a width of 80 mm, a length of 111 mm and a height of 85 mm with the pitch ratio between the short side and the long side being substantially $1:\sqrt{3}$ could be obtained. The cells of the ceramic honeycomb structural body were formed very uniformly. The Colburn number and the friction factor of the ceramic honeycomb structural body were measured, and the overall fin efficiency at the time of Reynolds number being 100 was determined to be 0.308. This ceramic honeycomb structural body was processed into a form of 70 mm in width, 100 mm in length, and 75 mm in height to obtain a unit honeycomb structural body. Thirty six of unit honeycomb structural bodies thus obtained were mechanically processed, and the above raw batch material was applied to the faces to be joined, and then the unit honeycomb structural bodies were joined together. Then, the joined ceramic structural bodies were fired again in the tunnel kiln and finished to obtain a rotary regeneration type ceramic heat exchanger according to the present invention of an outer size of 470 mm and a height of 75 mm.

EXAMPLE 2

2 parts of sodium alginate and 21 parts of water were added to 100 parts of powder consisting of 97 parts of silicon carbide powder, 1.5 parts of boron carbide powder, and 1.5 parts of carbon powder, and the mixture was well kneaded to prepare a raw batch material. The kneaded raw batch material was extruded under a pressure of 150 $kg/cm^2$ by using an extrusion die according to the present invention of 0.3 mm in the molding slit width, 1.0 mm in the length of short side and 1.73 mm in the length of the long side, which was equipped with a perforated plate positioned on the raw batch material supply side of the supply holes and having the perforated holes at such a hole rate that the raw batch material is supplied to three raw batch material supply holes through each one perforated hole. The extruded honeycomb structural body was cut at a given length, dried by a humidity control drier controlled at a relative humidity of 85% and a temperature of 40° C., and fired at 2,100° C. in an argon atmosphere by using an electric furnace to obtain a ceramic honeycomb structural body according to the present invention of 150 mm in width, 150 mm in length, and 40 mm in height with the pitch ratio between the short side and the long side being substantially $1:\sqrt{3}$. The cells of the ceramic structural body were uniformly formed and the inner wall surfaces of the cells were smooth.

EXAMPLE 3

10 parts of an emulsion of vinyl acetate resin (solid component about 40%) and 19 parts of water were added to 100 parts of a powder consisting of 6.4 parts of magnesium hydroxide, 46.2 parts of aluminum hydroxide and 47.4 parts of titanium oxide, and the mixture was fully kneaded to prepare a raw batch material. The raw batch material thus kneaded was extruded under a pressure of 250 $kg/cm^2$ by using a rectangular extrusion die according to the present invention of 0.5 mm in width, 2.50 mm in the length of the short side and 4.33 mm in the length of the long side with the pitch ratio between the short side and the long side being substantially $1:\sqrt{3}$. The honeycomb structural body thus extruded was cut at a specific length, and dried by supplying air into the cells, and fired at 1,500° C. in an electric furnace for 5 hours to sufficiently react the above described powder, thereby obtaining a ceramic honeycomb structural body consisting of magnesium aluminum titanate sintered body according to the present invention. The cells of the ceramic honeycomb structural body were formed uniformly, and the inner wall surfaces of the cells were smooth.

As understood from the above detailed description, according to the present invention, since the ceramic honeycomb structural body has the cell structure of a large overall fin efficiency, and such cells are densified, the exchanger heat transfer effectiveness is increased, and the pressure drop is low because the ceramic honeycomb structural body is shaped through extrusion, so that the ceramic honeycomb structural body excellent in heat exchange efficiency, and the heat exchanger using the same can be obtained together with the die for extrusion of the honeycomb structural body. Thus, the present invention is extremely useful for the industries of this type.

What is claimed is:

1. A rotary regenerator-type ceramic heat exchanger comprising a ceramic honeycomb structural body having a plurality of cells of a rectangular cross section, wherein a pitch ratio between a short side and a long side of said rectangular cells is substantially $1:\sqrt{3}$.

2. The rotary regenerator-type ceramic heat exchanger of claim 1, wherein said rectangular cells have a hydraulic diameter of 0.54 mm.

3. The rotary regenerator-type ceramic heat exchanger of claim 2, wherein said honeycomb structural body has an open area ratio of 0.70.

4. A ceramic honeycomb structural body comprising a plurality of cells having a rectangular cross section, wherein a pitch ratio between a short side and long side of said rectangular cells is substantially $1:\sqrt{3}$ and said rectangular cells have a hydraulic diameter of 0.54 mm.

5. The ceramic honeycomb structural body of claim 4, wherein said body has an open area ratio of 0.70.

* * * * *